(12) United States Patent
Takeda

(10) Patent No.: US 7,474,596 B2
(45) Date of Patent: Jan. 6, 2009

(54) OPTICAL DISK DEVICE AND TRACK-ON METHOD THEREOF

(75) Inventor: Futoshi Takeda, Daito (JP)

(73) Assignee: Funai Electric Co., Ltd., Osaka (JP)

(*) Notice: Subject to any disclaimer, the term of this patent is extended or adjusted under 35 U.S.C. 154(b) by 736 days.

(21) Appl. No.: 11/188,778

(22) Filed: Jul. 26, 2005

(65) Prior Publication Data

US 2006/0023576 A1 Feb. 2, 2006

(30) Foreign Application Priority Data

Jul. 27, 2004 (JP) ............................. 2004-218077

(51) Int. Cl.
*G11B 7/00* (2006.01)
(52) U.S. Cl. .................... 369/44.28; 369/53.3
(58) Field of Classification Search ............... None
See application file for complete search history.

(56) References Cited

U.S. PATENT DOCUMENTS 5,581,521 A * 12/1996 Nomura et al. .......... 369/44.35
6,266,304 B1 * 7/2001 Nagano et al. ........... 369/44.32
2004/0032807 A1 * 2/2004 Moriai .................... 369/53.28

FOREIGN PATENT DOCUMENTS

| JP | 2000-11393 A | 1/2000 |
| JP | 2002-93081 A | 3/2002 |

* cited by examiner

*Primary Examiner*—Paul Huber
(74) *Attorney, Agent, or Firm*—Global IP Counselors, LLP

(57) ABSTRACT

An optical disk device includes a pickup head, a thread motor, and a drive controller, and a thread drive IC. The drive controller supplies directed voltage to the thread drive IC. The thread drive IC in response supplies drive voltage to the thread motor, which moves the pickup based on the drive voltage from the thread drive IC. The drive controller directs to the thread drive IC supply of first directed voltage. The thread drive IC supplies first supplied voltage to the thread motor in response to the directive from the drive controller to supply the first directed voltage. The drive controller detects the first supplied voltage and calculates a correction value based on the detected first supplied voltage. The drive controller corrects the directed voltage with the correction value and then directs to the thread drive IC supply of a corrected drive voltage.

12 Claims, 3 Drawing Sheets

OPTICAL DISK DEVICE AND TRACK-ON METHOD THEREOF

BACKGROUND OF THE INVENTION

1. Field of the Invention

The present invention relates to an optical disk device that reads data recorded in a CD, DVD or other such optical disk, and records data to such optical disk. The present invention also relates to a track-on method of a pickup of such optical disk device.

2. Background Information

Optical disk devices that read data recorded in a CD, DVD or other such optical disks and record data to such optical disk have become hugely popular. As shown in Japanese Patent Application Publications Nos. 2002-93081 and 2000-11393, such optical disk devices are equipped with a pickup head. Such pickup head reads data recorded in an optical disk by directing a laser beam at an optical disk that is mounted in a main unit of the optical disk device, and detecting the light reflected by the optical disk.

The pickup head is provided with a laser diode (LD) that functions as the light source, an objective lens for focusing the laser beam outputted from the LD onto the recording surface of the optical disk, a photodiode (PD) that receives the light reflected from the optical disk, a biaxial actuator that moves the objective lens toward and away from the optical disk and in the radial direction of the optical disk, and so forth. The pickup head is supported so as to be movable in the radial direction of the optical disk.

Beside the pickup head, the optical disk device is further equipped with a thread motor for moving the pickup head in the radial direction of the optical disk, and a drive IC for supplying drive voltage to the thread motor. This drive IC supplies the thread motor with drive voltage as directed by a controller. The thread motor is driven by the drive voltage supplied from the drive IC. The pickup head is moved in the radial direction of the optical disk by the drive force of the thread motor.

With an optical disk device, the position (recording track) in an optical disk at which data to be read are recorded is controlled by moving the pickup head in the radial direction of the optical disk with a thread motor, and by to moving the objective lens in the radial direction of the optical disk with an actuator.

However, the drive voltage actually supplied to the thread motor can vary from the voltage specified by the controller. This is due to a variance in the amplification factors of the drive voltages of the drive ICs that supply drive voltage to the thread motor of the optical disk device.

With an optical disk device, when the power is first switched on or when an optical disk is mounted, an operation of moving the pickup head to the innermost peripheral position and then toward the outer periphery by a predetermined amount to the track-on position of the optical disk (hereinafter, this operation will be referred to as "re-zeroing") is performed. A problem is that the above-mentioned variance in amplification factors among the drive ICs results in variance in the track-on position at which the pickup head is positioned at the end of the re-zeroing (this position will hereinafter be referred to as the re-zeroing position) among different optical disk devices.

Consequently, depending on the optical disk, it is sometimes impossible to move the pickup head to a proper zeroing position in a single re-zeroing operation. When such problem is encountered conventionally, a retry operation is performed, in which the drive voltage used in the re-zeroing is changed. Although it is possible to start tracking at the proper re-zeroing position by changing the drive voltage, but this retry operation takes extra time.

In view of the above, it will be apparent to those skilled in the art from this disclosure that there exists a need for an improved optical disk device and a track-on method of such optical disk device that overcome the problems of the conventional art. This invention addresses this need in the art as well as other needs, which will become apparent to those skilled in the art from this disclosure.

SUMMARY OF THE INVENTION

It is an object of the present invention to provide an optical disk device of which the reliability can be improved and which is easy for the user to use.

A track-on method of an optical disk device in accordance with one aspect of the present invention includes steps of: a drive controller directing to a drive IC supply of first directed voltage, the drive IC supplying first supplied voltage to moving means in response to the directive from the drive controller to supply the first directed voltage, the drive controller detecting the first supplied voltage, calculating a correction value based on the detected first supplied voltage, and the drive controller correcting directed voltage with the correction value and then directing to the drive IC supply of a corrected directed voltage, the drive IC based on the corrected directed voltage supplying to the moving means a drive voltage with which the moving means moves a pickup head of the optical disk device to a track-on position.

An optical disk device in accordance with another aspect of the present invention includes a pickup head, a thread motor configured to move the pickup head, a drive controller, and a thread drive IC. The drive controller being configured to direct supply of directed voltage to the thread drive IC, the thread drive IC is configured to supply drive voltage to the thread motor in response to the directive from the drive controller. The thread motor is configured to move the pickup head with the drive voltage from the thread drive. The drive controller is configured to direct to the thread drive IC supply of first directed voltage. The thread drive IC is configured to supply first supplied voltage to the thread motor in response to the directive from the drive controller to supply the first directed voltage. The drive controller is configured to detect the first supplied voltage and calculate a correction value based on the detected first supplied voltage. The drive controller is configured to correct directed voltage with the correction value and then direct to the thread drive IC supply of a corrected directed voltage. The drive IC based on the corrected directed voltage supplies to the moving means a drive voltage with which the thread motor moves the pickup head to a track-on position.

With this constitution, the drive controller directs the drive IC to supply a predetermined voltage to the thread motor or the movement means, and detects the drive voltage that the drive IC actually supplies to the movement means. The drive controller calculates the correction value based on the predetermined voltage directed to the drive IC and the voltage actually supplied by the drive IC to the movement means. This correction value is calculated, for example, from the ratio between the voltage that the drive controller has directed the drive IC to supply to the movement means (hereinafter referred to as the directed voltage) and the voltage that the drive IC actually supplies to the moving means (hereinafter referred to as the supplied voltage). The drive controller then corrects the directed voltage with this correction value when the voltage to be supplied to the moving is directed to the drive IC, and directs the drive IC to supply this corrected directed voltage as the drive voltage to the moving means.

This means it is possible to suppress variance among optical disk devices in the drive voltage that is actually supplied to the thread motor in response to the directive from the drive controller to supply the drive voltage. As a result, there is less variance among optical disk devices in the track-on position of the optical disk (this position will hereinafter be referred to as the re-zeroing position). Accordingly, the reliability can be improved and the optical disk device is easy for the user to use.

Here, the first directed voltage is set low enough that there will be substantially no movement of the pickup head. Therefore, there is no damage due to, for example, the pickup head moving suddenly or colliding into other components.

In the track-on method and the optical disk device of the present invention, the calculation of the correction value is performed when the power of the optical disk device is turned on with an optical disk being mounted therein, or when an optical disk is mounted in the optical disk device for the first time after the power of the optical disk device is turned on.

With this constitution, the correction value is calculated when the power is turned on with an optical disk being mounted in the optical disk device, or when the optical disk is mounted in the optical disk device for the first time after the power is turned on. Therefore, the track-on position is less likely to be affected by changes in the re-zeroing position that occur over time.

In the track-on method and the optical disk device of the present invention, the drive controller further directs to the drive IC supply of second directed voltage. The second directed voltage is of opposite polarity from that of the first directed voltage and has the same absolute value as that of the first directed voltage. The drive IC supplies second supplied voltage to the moving means in response to the directive from the drive controller to supply the second directed voltage. The drive controller detects the second supplied voltage. The correction value is calculated based on the detected first and second supplied voltages.

With this constitution, the correction value can be calculated while taking into account any offset voltage actually supplied by the drive IC to the moving means, which further reduces variance in the re-zeroing position among optical disk devices.

Here, the first and second directed voltage is set low enough that there will be substantially no movement of the pickup head. Therefore, there is no damage due to, for example, the pickup head moving suddenly or colliding into other components.

In the track-on method and the optical disk device of the present invention, the drive controller is configured to calculate an offset voltage based on:

offset voltage=(the absolute value of first supplied voltage–the absolute value of second supplied voltage)÷2, and the drive controller is configured to calculate the correction value based on either:

correction value=detected first supplied voltage÷(detected first supplied voltage –offset voltage)

or correction value=detected second supplied voltage÷ (detected second supplied voltage–offset voltage).

In the track-on method and the optical disk device of the present invention, when the drive controller directs to the thread drive IC supply of a corrected drive voltage to move the pickup head to the track-on position, the drive controller is configured to direct supply of corrected home return drive voltage, based on which the thread motor moves the pickup head to a home position, and then supply of corrected outward drive voltage, based on which the thread motor moves the pickup head in a radially outward direction to the track-on position.

In the track-on method and the optical disk device of the present invention, in the directing to the drive IC the supply of the corrected directed voltage by the drive controller, the drive controller directs supply of corrected home return directed voltage, based on which the moving means moves the pickup head to a home position, and then directs supply of corrected outward directed voltage, based on which the moving means moves the pickup head in a radially outward direction to the track-on position.

With this construction, the correction of the directed voltage is performed both with the operation of moving the pickup head to the innermost peripheral position, and the operation of moving the pickup head by a specific distance toward the outer periphery so as to position the pickup head at the initial track of the optical disk (hereinafter this operation will be referred to as "re-zeroing"). Accordingly, the reliability is improved and the device is easy for the user to use.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

An optical disk device that is an embodiment of the present invention will now be described.

Figure 1:
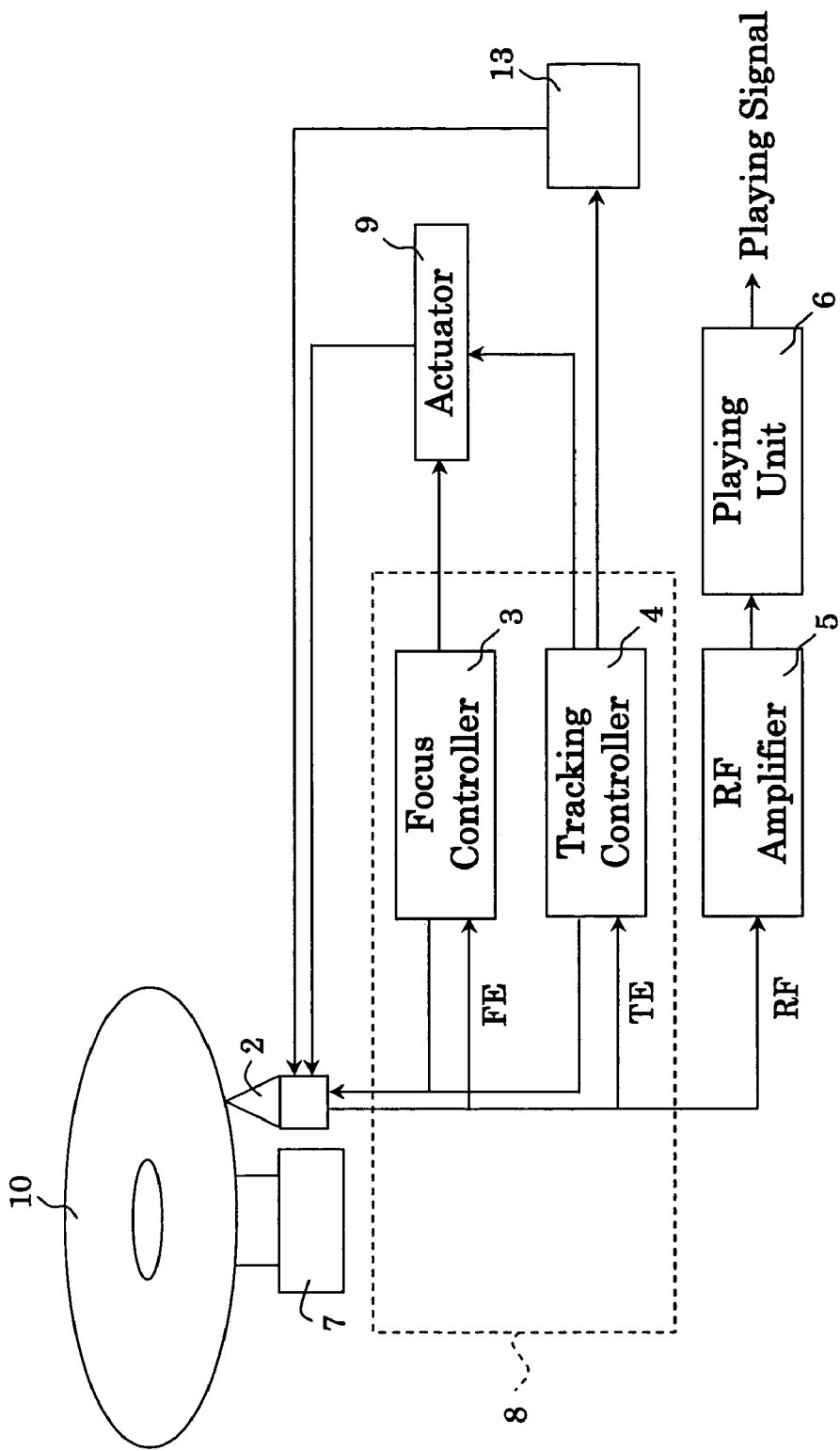
FIG. 1 is a schematic view of the main components of the optical disk device in accordance with an embodiment of the present invention.

FIG. 1 is a schematic diagram of the constitution of the main components of the optical disk device in accordance with an embodiment of the present invention. The optical disk device 1 in this embodiment includes a pickup head 2 that directs a laser beam at an optical disk 10 mounted in the optical disk device, an RF amplifier 5 that amplifies an RF signal generated when the data recorded on the optical disk 10 are read, a playing unit 6 that generates and outputs a playing signal based on the RF signal amplified by the RF amplifier 5, a spindle motor 7 that spins the optical disk 10, and a controller 8 that is operatively coupled to the pickup head 2, the spindle motor 7, and the RF amplifier 5. The controller 8 selectively controls various components operatively connected thereto. The controller 8 includes a focus controller 3 that performs focus control with an actuator 9 by focusing the laser beam on a recording surface of the optical disk 10, and a tracking controller 4 that performs tracking control with a thread motor 13 by focusing the laser beam on the track of the optical disk 10. The controller 8 also performs other controls not performed by the focus controller 3 and the tracking controller 4, such as control of the spindle motor 7.

The pickup head 2 is provided with a laser diode (LD) which serves as the light source, an objective lens for focusing the laser beam emitted from the LD, a biaxial actuator 9 for moving the objective lens toward and away from the optical disk 10 (the focusing direction) and in the radial direction of the optical disk (the tracking direction), a photodiode (PD) for detecting the light reflected from the optical disk 10, and so forth.

Figure 2:
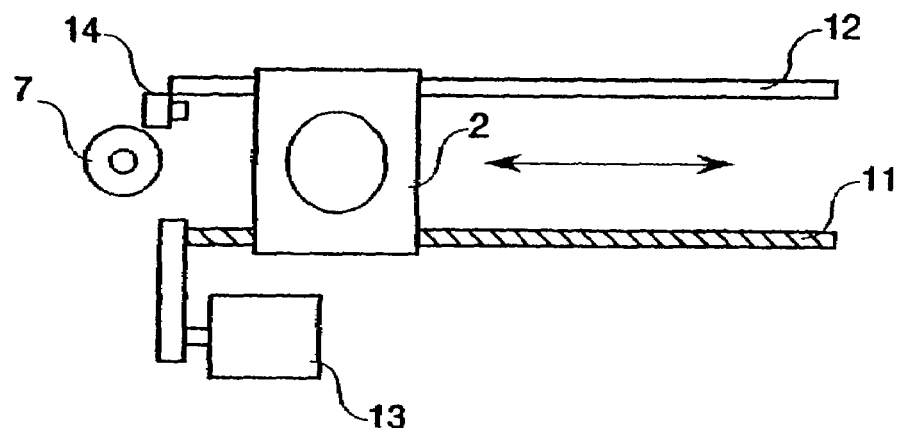
FIG. 2 is a schematic view of the structure by which the pickup head is attached in the optical disk device in accordance with the embodiment of the present invention.

As shown in FIG. 2, this pickup head 2 is movably attached to a screw shaft 11 and a guide shaft 12 that extend in the radial direction of the optical disk 10. The screw shaft 11 and the guide shaft 12 are disposed in parallel. The drive force of the thread motor 13 is transmitted through a gear (not shown) to the screw shaft 11. In this manner, the thread motor 13 rotates the screw shaft 11, thereby moving the pickup head 2 in the radial direction of the optical disk 10.

A micro-switch is pressed ON by the pickup head 2 when the pickup head 2 moves to the innermost peripheral position (hereinafter referred to as the home position). In other words, when the micro-switch 14 is switched ON, it indicates that the pickup head 2 has reached the home position. In this manner, the micro-switch 14 detects whether the pickup head 2 has reached the home position.

Also, the pickup head 2 makes use of a conventional quad photodiode to detect light reflected from the optical disk 10. The pickup head 2 outputs a focus error signal (hereinafter referred to as FE signal), a tracking error signal (hereinafter referred to as TE signal), and an RF signal depending on the light detected. The controller 8 receives a signal from the pickup head 2, and determines whether the signal is a TE signal, an FE signal, or a RF signal.

The RF signal is inputted to the RF amplifier 5 as a signal indicating the data read from the optical disk 10.

As is commonly known, an FE signal indicates the distance between the recording surface of the optical disk 10 and the focal position of the laser beam when the focal point of the laser beam is not on the recording surface of the optical disk 10. A FE signal is inputted to the focus controller 3, as shown in FIG. 1. The focus controller 3 controls the actuator 9 As a result, the objective lens of the pickup head 2 moves toward or away from the optical disk 10 based on the FE signal inputted from the pickup head 2, so that the laser beam emitted by the LD is focused on the recording surface of the optical disk 10.

A TE signal indicates, when the focal point of the laser beam is not on the center of the track of the optical disk 10, the distance between the center of the track of the optical disk 10 and the position on the optical disk 10 beamed by the laser beam. A TE signal is inputted to the tracking controller 4.

The drive controller 23 indicates, as a voltage to be supplied to the thread motor 13, to a thread drive IC 21 of the tracking controller 4 the distance by which the pickup head 2 should be moved in the radial direction of the optical disk 10 based on the TE signal inputted from the pickup head 2 at the time of playing or recording operation. The drive controller 23 indicates, as a voltage to be supplied to the actuator 9, to the actuator drive IC 22 the distance by which the objective lens should be moved in the radial direction of the optical disk 10.

Figure 3:
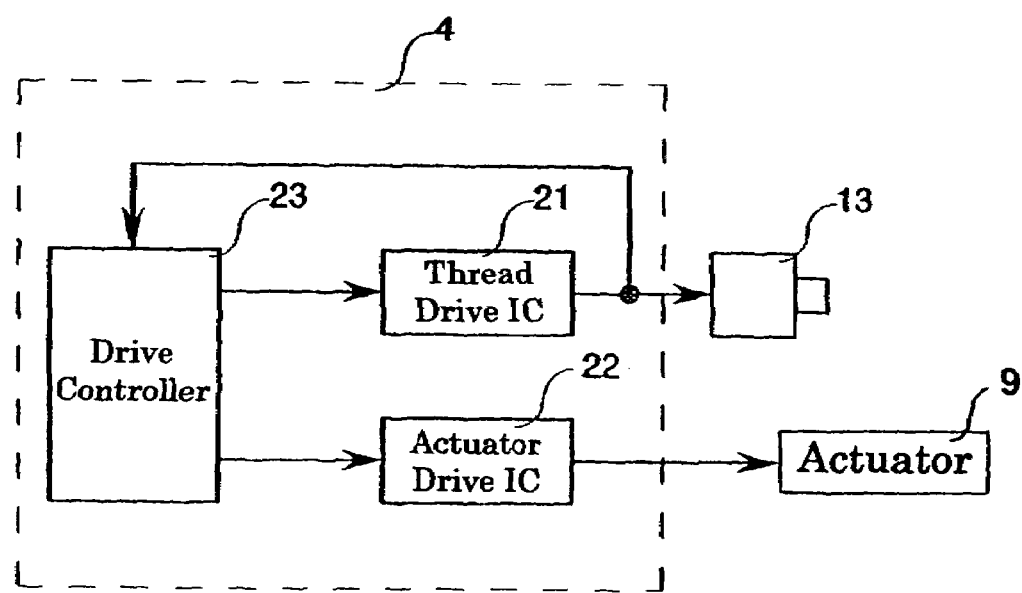
FIG. 3 is a schematic view of the tracking controller of the optical disk device in accordance with the embodiment of the present invention.

As shown in FIG. 3, the tracking controller 4 includes an actuator drive IC 22 that drives the actuator 9 to move the objective lens of the pickup head 2 in the radial direction of the optical disk 10. The tracking controller 4 also includes a thread drive IC 21 that supplies drive voltage to the thread motor 13 according to a TE signal from the pickup head 2. The tracking controller 4 moves the pickup head 2 in the radial direction of the optical disk 10, moves the objective lens of the pickup head 2 in the radial direction of the optical disk 10, such that the laser beam emitted from the LD is directed at the center of the track of the optical disk 10.

The drive voltage outputted from the thread drive IC 21 and supplied to the thread motor 13 is fed back to the drive controller 23. The drive controller 23 is provided with a memory. This memory stores, for example, the offset voltages and correction values of the thread drive IC 21, which will be discussed below, as well as the drive voltages (first directed voltage and second directed voltage) that indicated to the thread drive IC 21 as the drive voltages to be supplied to the thread motor 13 when the offset voltages and correction values are to be calculated.

Operation

The operation of the optical disk device 1 in accordance with this embodiment of the present invention will now be described.

The optical disk device 1 is designed such that when the power is turned on, or when the optical disk 10 is mounted in place, the optical disk device 1 performs the re-zeroing. In other words, the pickup head 2 is first moved to the home position, and then the pickup head 2 is moved by a certain distance toward the outer periphery to the re-zeroing position, thereby being driven to the initial track of the optical disk 10. Once the re-zeroing is performed and the pickup head 2 is at the initial track, the optical disk device 1 then begins the playing or recording operation with the optical disk 10. Here, the distance by which the pickup head 2 is moved toward the outer periphery to the re-zeroing position after first being moved to the home position is set so that the re-zeroing position corresponds to the innermost track of the optical disk 10.

Figure 4:
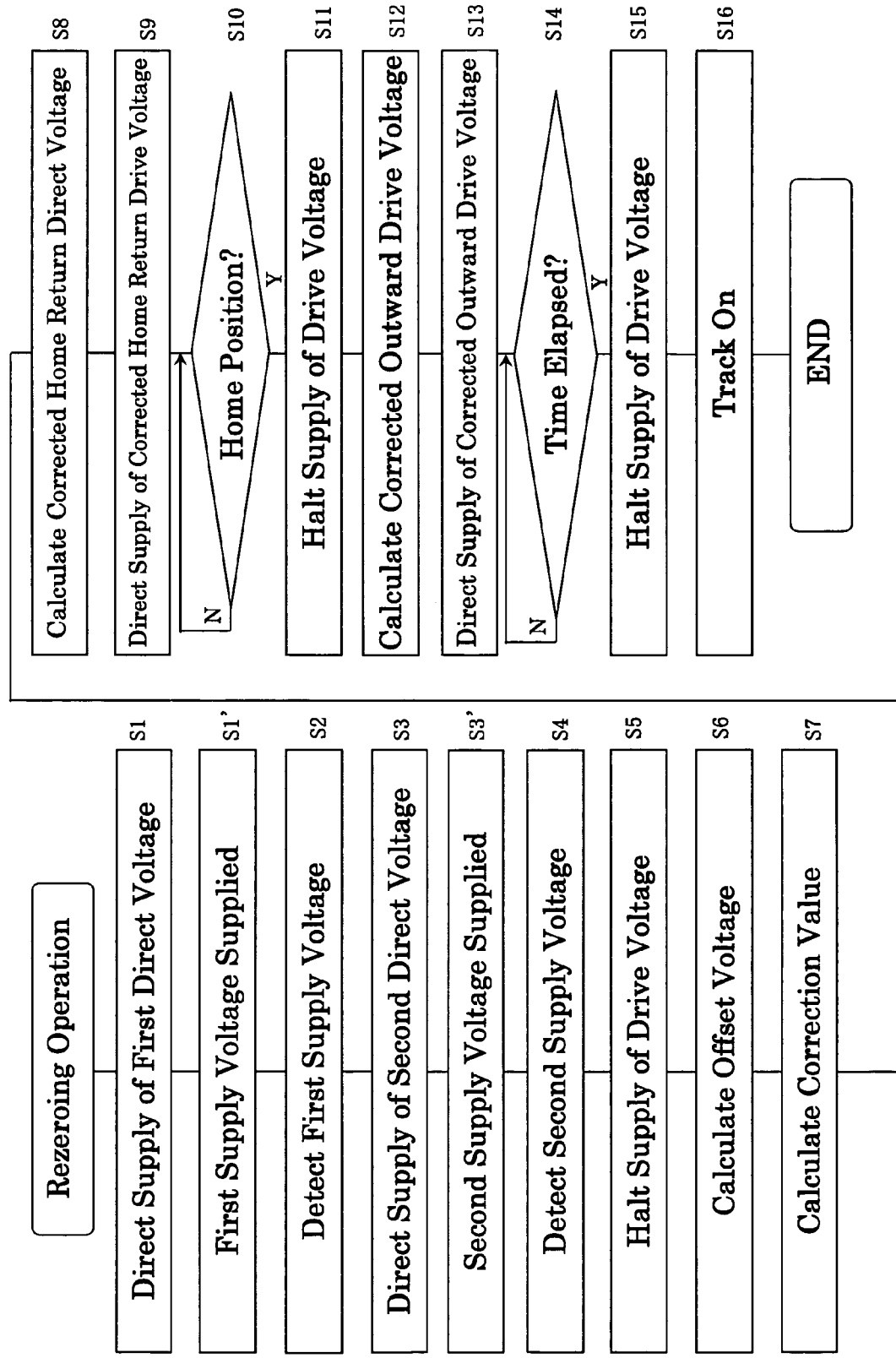
FIG. 4 is a flowchart of the re-zeroing operation performed with the optical disk device in accordance with the embodiment of the present invention.

The optical disk device 1 in accordance with this embodiment is configured such that the offset voltage and the correction value of the thread drive IC 21 are calculated during the re-zeroing operation that is performed when the power is turned on with an optical disk being mounted, or when an optical disk is mounted for the first time after the power is turned on. FIG. 4 is a flowchart of the re-zeroing operation by the optical disk device 1 of this embodiment. The optical disk device 1 is configured to perform this re-zeroing operation when the power is turned on with an optical disk being mounted, or when the optical disk is mounted for the first time after the power is turned on.

In Step S1, the drive controller 23 of the tracking controller 4 of the optical disk device 1 directs the thread drive IC 21 to supply to the thread motor 13 a predetermined first directed voltage as the drive voltage. In Step S1', the thread drive IC 21 follows this directive and supplies the drive voltage to the thread motor 13. This first directed voltage is a relatively low voltage, so there will be no sudden movement of the pickup head 2.

In Step S2, the drive controller 23 detects the magnitude of the voltage that has been actually supplied from the thread drive IC 21 to the thread motor 13 (the "first supply voltage") in response to the directive of Step S2, using the voltage outputted from the thread drive IC 21 to the thread motor 13 and fed back to the drive controller 23.

Upon detecting the first directed voltage, the drive controller 23 in Step S3 directs the thread drive IC 21 to supply a second directed voltage. This second directed voltage has the same absolute value as the first directed voltage, and is of opposite polarity from that of the first directed voltage. Then, the thread drive IC 21 follows this directive and supplies the drive voltage of the second directed voltage to the thread motor 13. As discussed above, the second directed voltage is also a relatively low voltage, as is the first directed voltage. Therefore, there will be no sudden movement of the pickup head 2.

In Step S4, the drive controller 23 detects the amount of voltage actually supplied from the thread drive IC 21 to the thread motor 13 (the "second supply voltage") in response to the directive of Step S3.

Upon detecting the second supply voltage in Step S4, the drive controller 23 in Step S5 directs the thread drive IC 21 to halt the supply of drive voltage to the thread motor 13. The thread drive IC 21 follows this directive and halts the supply of drive voltage to the thread motor 13. This brings the thread motor 13 to a stop.

The first directed voltage may be of a polarity that moves the pickup head 2 toward the inner periphery of the optical disk 10, or a polarity moves the pickup head 2 toward the outer periphery. The polarity of the second directed voltage is opposite that of the first directed voltage. Also, since only an extremely short time is needed to detect the first supply voltage and the second supply voltage, and the pickup head 2 hardly moves at all due to the supply of the first supply voltage and the second supply voltage. Therefore, when the first supply voltage and the second supply voltage are detected, there is no sudden movement of the pickup head 2 that would result in damage through collision or other such impact.

In Step S6, the drive controller 23 uses the first supply voltage detected in Step S2 and the second supply voltage detected in Step S4 to calculate the offset voltage of the thread drive IC 21. In Step S6 of the present invention, the offset voltage is calculated as half the difference between the absolute value of the first supply voltage and the absolute value of the second supply voltage. More specifically, the offset voltage is calculated as follows.

$$\text{Offset Voltage} = (|\text{First Supply Voltage}| - |\text{Second Supply Voltage}|) \div 2$$

The polarity of this offset voltage herein is the same as the polarity of one of the first and second supply voltages that has the larger absolute.

Next, In Step S7, the drive controller 23 uses the first supply voltage detected in Step S2 and the second supply voltage detected in Step S4 to calculate the correction value with respect to the amplification factor of the thread drive IC 21. In Step S7, the correction value is calculated by dividing the first directed voltage directed in Step S1 by the difference between the first supply voltage detected in Step S2 and the offset voltage calculated in Step S6. More specifically, the correction value is calculated as follows.

$$\text{Correction Value} = \text{First Supply Voltage} \div (\text{First Supply Voltage} - \text{Offset Voltage})$$

The correction value may also be calculated as follows.

$$\text{Correction Value} = \text{Second Supply Voltage} \div (\text{Second Supply Voltage} - \text{Offset Voltage})$$

The drive controller 23 stores in the memory the offset voltage calculated in Step S6 and the correction value calculated in Step S7. The optical disk device 1 thereafter calculates corrected drive voltage (corrected directed voltage) based on the offset voltage calculated in Step S6 and the correction value calculated in Step S7.

More specifically, in Step S8, when the drive controller 23 moves the pickup head 2 to the home position during the re-zeroing operation, the drive controller 23 stores therein the home return drive voltage, which is the drive voltage that the thread drive IC 21 supplies to the thread motor 13 when the pickup head 2 is moved to the home position during the re-zeroing operation. Then, corrected drive voltage (the corrected home return drive voltage, an example of corrected directed voltage), is calculated based on the home return drive voltage, the offset voltage, and the correction value. More specifically, in Step S8, the corrected home return drive voltage is obtained by multiplying the difference between the home return drive voltage and the offset voltage obtained in Step S6 with the correction value obtained in Step S7. In other words, the corrected home return drive voltage can be obtained with the following equation:

$$\text{Corrected Home Return Drive Voltage} = (\text{Home Return Drive Voltage} - \text{Offset Voltage}) \times \text{Correction Value}$$

In Step S9, the drive controller 23 directs the thread drive IC 21 to supply the corrected home return drive voltage calculated in Step S8 to the thread motor 13 as the drive voltage. The thread drive IC 21 follows this directive and supplies the corrected home return drive voltage to the thread motor 13.

In Step S10, the drive controller 23 waits until the pickup head 2 reaches the home position. When the micro-switch 14 is switched ON, the drive controller 23 determines that the pickup head 2 has reached the home position. When it is determined that that the pickup head 2 has reached the home position, the process proceeds to Step S11.

In Step S11, the drive controller 23 directs the thread drive IC 21 to halt the supply of drive voltage to the thread motor 13. The thread drive IC 21 follows this directive and halts the supply of drive voltage to the thread motor 13.

Then, when the pickup head 2 is to be moved by a specific distance from the home position toward the outer periphery of the optical disk 10, the drive controller 23 in Step S12 calculates corrected drive voltage (corrected outward drive voltage, another example of corrected directed voltage) that should be directed to the thread drive IC 21 and that the thread drive IC 21 should supply to the thread motor 13, based on the uncorrected outward drive voltage (outward drive voltage), the offset voltage obtained in Step S6, and the correction value obtained in Step S7. The drive controller 23 stores in the memory the outward drive voltage, and the time period (time period of outward movement) during which the thread drive IC 21 is directed to supply the outward drive voltage to the thread motor 13. In Step S12, the corrected outward drive voltage is calculated by multiplying the difference between the offset voltage calculated in Step S6 and the outward drive voltage at the time of outward movement stored in the memory with the correction value calculated in Step S7. More specifically, the corrected outward drive voltage at the time of outward movement is obtained with following equation:

$$\text{Corrected Outward Drive Voltage} = (\text{Drive Voltage at the time of outward movement} - \text{offset voltage}) \times \text{Correction Value}$$

In Step S13, the drive controller 23 directs the thread drive IC 21 to supply the corrected outward drive voltage calculated in Step S12 to the thread motor 13. The thread drive IC 21 follows this directive and supplies the corrected outward drive voltage to the thread motor 13.

In Step S14, after directing the thread drive IC 21 to supply the corrected outward drive voltage to the thread motor 13 in Step S13, the drive controller 23 waits until a predetermined time period, during which the thread drive IC 21 is directed to supply this corrected outward drive voltage to the thread motor 13 has elapsed. Once the time period of outward movement has elapsed, the process then proceeds to Step S15.

In Step S15, the drive controller 23 directs the thread drive IC 21 to halt the supply of drive voltage to the thread motor 13. The thread drive IC 21 follows this directive and halts the supply of drive voltage to the thread motor 13.

Once the processing of Step S15 is complete, the optical disk device 1 in Step S16 switches on a focusing servo controlled by the focus controller 3 and a tracking servo controlled by the tracking controller, and positions the pickup head 2 at the initial track of the optical disk 10. The initial track here is the re-zeroing position.

When the pickup head 2 is at the re-zeroing position, the optical disk device 1 decides whether or not the re-zeroing position is at the proper track. If it is not at the proper track, a seek operation is performed to bring the head to the proper track, and then the playing of the optical disk 10 is commenced.

When the re-zeroing is performed when the optical disk 10 is replaced with a new one after the re-zeroing operation shown in FIG. 4 has already been performed, the processes of Steps S1-S7 are omitted. Instead, only the processes of Steps S8 and thereafter are performed. At this time also, the offset voltage and the correction value calculated in the re-zeroing operation performed when the power is turned with an optical disk being mounted, or when an optical disk is mounted for the first time after the power has been turned on are utilized Also, when the pickup head 2 is moved by the thread motor 13 in the radial direction of the optical disk 10 during the seek operation or the playing operation, the offset voltage and the correction value calculated during the re-zeroing operation as discussed above are used to correct the drive voltage that should be supplied to the thread motor 13 by the thread drive IC 21.

In this manner, the offset voltage of the thread drive IC 21 and the correction for the amplification factor are obtained during the re-zeroing operation that is performed when the power is turned on with an optical disk being mounted, or when the optical disk is mounted for the first time after the power turned on. Then, the offset voltage and the correction value are utilized to correct the drive voltage supplied to the thread drive IC 21 as the drive voltage that the thread drive IC 21 should supply to the thread motor 13. Thus, there is less of the variance in the re-zeroing positions among optical disk devices 1 due to variance in the amplification factors and offset voltages of the thread drive ICs. Accordingly, reliability is improved and the optical disk device becomes easy for the user to use.

Also, because the offset voltage and the correction value are calculated when the power is turned on with an optical disk being mounted, or when the optical disk is mounted for the first time after the power has been turned on, there is less of the variance in the re-zeroing position due to degradation of the thread drive IC.

The present invention makes it possible to reduce variance among optical disk devices in the drive voltage supplied by the drive means to the thread motor. Therefore, there is less variance among optical disk devices in the position where the pickup head starts tracking on the optical disk after the pickup head is moved to the innermost peripheral position of the optical disk and then toward the outer periphery of the optical disk so as to reach the initial track of the optical disk. Accordingly, the reliability of the optical disk device is improved, and the optical disk device remains easy for the user to use.

As used herein, the following directional terms "forward, rearward, above, downward, vertical, horizontal, below and transverse" as well as any other similar directional terms refer to those directions of a device equipped with the present invention. Accordingly, these terms, as utilized to describe the present invention should be interpreted relative to a device equipped with the present invention.

The term "configured" as used herein to describe a component, section or part of a device includes hardware and/or software that is constructed and/or programmed to carry out the desired function.

Moreover, terms that are expressed as "means-plus function" in the claims should include any structure that can be utilized to carry out the function of that part of the present invention.

The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

This application claims priority to Japanese Patent Application No. 2004-218077. The entire disclosure of Japanese Patent Application No. 2004-218077 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A track on method of an optical disk device, comprising steps of:
   a drive controller directing to a drive IC supply of first directed voltage;
   the drive IC supplying first supplied voltage to moving means in response to the directive from the drive controller to supply the first directed voltage;
   the drive controller detecting the first supplied voltage;
   calculating a correction value based on the detected first supplied voltage; and
   the drive controller correcting directed voltage with the correction value and then directing to the drive IC supply of a corrected directed voltage, the drive IC based on the corrected directed voltage supplying to the moving means a drive voltage with which the moving means moves a pickup head of the optical disk device to a track-on position.

2. The track on method according to claim 1, wherein the calculation of the correction value is performed when the power of the optical disk device is turned on with an optical disk being mounted therein, or when an optical disk is mounted in the optical disk device for the first time after the power of the optical disk device is turned on.

3. The track on method according to claim 1, further comprising
the drive controller directing to the drive IC supply of second directed voltage, the second directed voltage being of opposite polarity from that of the first directed voltage and having the same absolute value as that of the first directed voltage;
the drive IC supplying second supplied voltage to the moving means in response to the directive from the drive controller to supply the second directed voltage; and
the drive controller detecting the second supplied voltage, wherein
the correction value is calculated based on the detected first and second supplied voltages.

4. The track on method according to claim 3, further comprising
calculating an offset voltage based on:

offset voltage=(the absolute value of first supplied voltage−the absolute value of second supplied voltage)÷2, wherein the correction value is calculated based on either:

correction value=detected first supplied voltage÷(detected first supplied voltage −offset voltage)

or correction value=detected second supplied voltage÷ (detected second supplied voltage−offset voltage).

5. The track on method according to claim 1, wherein
in the directing to the drive IC the supply of the corrected directed voltage by the drive controller, the drive controller directs supply of corrected home return directed voltage, based on which the moving means moves the pickup head to a home position, and then directs supply of corrected outward directed voltage, based on which the moving means moves the pickup head in a radially outward direction to the track-on position.

6. The track on method according to claim 1, wherein
the moving means is a thread motor.

7. An optical disk device in which an optical disk is adapted to be mounted, comprising:
a pickup head;
a thread motor configured to move the pickup head;
a drive controller; and
a thread drive IC, the drive controller being configured to direct supply of directed voltage to the thread drive IC, the thread drive IC being configured to supply drive voltage to the thread motor in response to the directive from the drive controller, the thread motor being configured to move the pickup head with the drive voltage from the thread drive IC;
wherein
the drive controller is configured to direct to the thread drive IC supply of first directed voltage,
the thread drive IC is configured to supply first supplied voltage to the thread motor in response to the directive from the drive controller to supply the first directed voltage,
the drive controller is configured to detect the first supplied voltage and calculate a correction value based on the detected first supplied voltage, and
the drive controller is configured to correct directed voltage with the correction value and then direct to the thread drive IC supply of a corrected directed voltage, the drive IC based on the corrected directed voltage supplying to the moving means a drive voltage with which the thread motor moves the pickup head to a track-on position.

8. The optical disk device according to claim 7, wherein
the calculation of the correction value is configured to be performed when the power of the optical disk device is turned on with an optical disk being mounted therein, or when an optical disk is mounted in the optical disk device for the first time after the power of the optical disk device is turned on.

9. The optical disk device according to claim 7, wherein
the drive controller is further configured to direct to the thread drive IC supply of second directed voltage, the second directed voltage being of opposite polarity from that of the first directed voltage and having the same absolute value as that of the first directed voltage;
the thread drive IC is further configured to supply second supplied voltage to the thread motor in response to the directive from the drive controller to supply the second directed voltage, and
the drive controller is further configured to detect the second supplied voltage and calculate the correction value based on the detected first and second supplied voltages.

10. The optical disk device according to claim 9, wherein
the drive controller is configured to calculate an offset voltage based on:

offset voltage=(the absolute value of first supplied voltage−the absolute value of second supplied voltage)÷2, and the drive controller is configured to calculate the correction value based on either:

correction value=detected first supplied voltage÷(detected first supplied voltage −offset voltage)

or correction value=detected second supplied voltage÷ (detected second supplied voltage−offset voltage).

11. The optical disk device according to claim 7, wherein
when the drive controller directs to the thread drive IC supply of a corrected drive voltage to move the pickup head to the track-on position, the drive controller is configured to direct supply of corrected home return drive voltage, based on which the thread motor moves the pickup head to a home position, and then supply of corrected outward drive voltage, based on which the thread motor moves the pickup head in a radially outward direction to the track-on position.

12. An optical disk device in which an optical disk is adapted to be mounted, comprising:
a pickup head having a light source element, a photo receiver element, and an objective lens;
a spindle motor;
an actuator configured to move the objective lens;
a thread motor configured to move the pickup head in a radial direction of an optical disk; and
a controller operatively coupled to the spindle motor, the actuator, and the thread motor, the controller including
a drive controller, and
a thread drive IC, the drive controller being configured to supply a directed voltage to the thread drive IC, the thread drive IC being configured to supply a drive voltage to the thread motor in response to the directive from the drive controller, the thread motor being configured to move the pickup head in the radial direction based on the drive voltage from the thread drive IC;

wherein when the power of the optical disk device is turned with an optical disk being mounted therein, or when an optical disk is mounted in the optical disk device for the first time after the power of the optical disk device is turned on, the drive controller is configured to direct to the thread drive IC supply of first directed voltage, the thread drive IC is configured to supply first supplied voltage to the thread motor in response to the directive from the drive controller to supply the first directed voltage, the drive controller is configured to detect the first supplied voltage, the drive controller is configured to direct to the thread drive IC supply of second directed voltage, the second directed voltage being of opposite polarity from that of the first directed voltage and having the same absolute value as that of the first directed voltage, the thread drive IC is configured to supply second supplied voltage to the thread motor in response to the directive from the drive controller to supply the second directed voltage, the drive controller is configured to detect the second supplied voltage and calculate the correction value based on the detected first and second supplied voltages, and the drive controller is configured to correct directed voltage with the correction value and then direct to the thread drive IC supply of a corrected directed voltage, the drive IC based on the corrected directed voltage supplying to the moving means a drive voltage with which the thread motor moves the pickup head to a track-on position.

* * * * *